United States Patent
Sekiguchi et al.

(10) Patent No.: US 10,038,399 B2
(45) Date of Patent: Jul. 31, 2018

(54) ELECTRIC MOTOR CONTROL DEVICE

(71) Applicant: Mitsubishi Electric Corporation, Chiyoda-ku (JP)

(72) Inventors: Hiroyuki Sekiguchi, Tokyo (JP); Hidetoshi Ikeda, Tokyo (JP); Yuji Igarashi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/547,604

(22) PCT Filed: Dec. 10, 2015

(86) PCT No.: PCT/JP2015/084717
§ 371 (c)(1),
(2) Date: Jul. 31, 2017

(87) PCT Pub. No.: WO2016/136094
PCT Pub. Date: Sep. 1, 2016

(65) Prior Publication Data
US 2018/0013376 A1    Jan. 11, 2018

(30) Foreign Application Priority Data
Feb. 27, 2015    (JP) ................. 2015-039309

(51) Int. Cl.
*H02P 29/68*    (2016.01)
(52) U.S. Cl.
CPC .................... *H02P 29/68* (2016.02)
(58) Field of Classification Search
CPC .................................................. H02P 29/68
(Continued)

(56) References Cited

U.S. PATENT DOCUMENTS

| 6,778,942 B2 | 8/2004 | Miura |
| 8,650,965 B2 | 2/2014 | Hashiguchi et al. |

(Continued)

FOREIGN PATENT DOCUMENTS

| JP | 2002-341909 A | 11/2002 |
| JP | 2003-70287 A | 3/2003 |

(Continued)

OTHER PUBLICATIONS

International Search Report dated Mar. 8, 2016 in PCT/JP2015/084717 filed Dec. 10, 2015.

*Primary Examiner* — Shawki S Ismail
*Assistant Examiner* — Bradley Brown
(74) *Attorney, Agent, or Firm* — Oblon, McClelland, Maier & Neustadt, L.L.P.

(57) ABSTRACT

A motor-control device includes: a command generation unit; an operation detection unit; a drive control unit outputting a drive control signal, a speed signal, and a drive force signal; a current control unit outputting a drive current and the drive current detection value; a mechanical characteristic estimation unit outputting a mechanical characteristic estimation value; an integration unit outputting an integrated drive time or drive amount integrated value of a drive unit; a set period determination unit outputting a signal indicating a set period for a mechanical characteristic permissible threshold output unit; a mechanical characteristic permissible threshold output unit outputting a mechanical characteristic permissible threshold; and a mechanical characteristic abnormality detection unit detecting a mechanical characteristic abnormality.

13 Claims, 6 Drawing Sheets

(58) Field of Classification Search
USPC .......................................................... 318/452
See application file for complete search history.

(56) References Cited

U.S. PATENT DOCUMENTS

| | | | |
|---|---|---|---|
| 9,122,258 | B2 | 9/2015 | Sekiguchi et al. |
| 9,124,212 | B2 | 9/2015 | Shimoda et al. |
| 9,346,162 | B2 | 5/2016 | Hashiguchi et al. |
| 2002/0173935 | A1* | 11/2002 | Miura .............. G05B 19/41875 702/182 |
| 2004/0183494 | A1* | 9/2004 | Nagaoka ................ G05B 19/19 318/632 |
| 2012/0001573 | A1* | 1/2012 | Kimpara ............... H02P 29/032 318/400.02 |
| 2012/0048027 | A1* | 3/2012 | Hashiguchi ............ B25J 9/0087 73/763 |

FOREIGN PATENT DOCUMENTS

| | | | |
|---|---|---|---|
| JP | 2004-362204 | A | 12/2004 |
| JP | 2012-8030 | A | 1/2012 |
| JP | 2012-130160 | A | 7/2012 |
| JP | 2012-139772 | A | 7/2012 |
| JP | 2014-183651 | A | 9/2014 |
| JP | 6104463 | B2 | 3/2017 |
| WO | 2012/160874 | A1 | 11/2012 |
| WO | 2012/165011 | A1 | 12/2012 |
| WO | 2015/163063 | A1 | 10/2015 |

* cited by examiner

ELECTRIC MOTOR CONTROL DEVICE

FIELD

The present invention relates to an electric motor control device controlling an electric motor that drives a drive mechanism.

BACKGROUND

Conventionally, in a mechanical device including a drive unit composed of an electric motor and a drive mechanism, particularly a mechanical device for industrial machinery, if its operation is stopped for a reason of an abnormality caused by service life or damage of the drive unit, the production activity or physical distribution is stopped. In the circumstances, such a mechanical device is required to predict occurrence of an abnormality, and/or to detect an abnormality at an early or minor stage.

For example, Patent Literature 1 discloses a numeric control device having a failure diagnosis program for determining whether or not values of friction torque and friction force fall within ranges of predetermined permissible values, the values of friction torque and friction force being calculated while a drive mechanism is subjected to a move and stop operation with a unit movement amount in one and the same direction for two or more times, and further to a move and stop operation with the unit movement amount in the opposite direction for two or more times.

Further, for example, Patent Literature 2 discloses a rotator bearing diagnostic device comprising: a vibration waveform database that stores a vibration waveform of a bearing of a rotator rotated by a motor; feature frequency extracting means that extract a vibration component of a theoretical frequency corresponding to a target-device specification from FFT analysis on the vibration waveform; statistic calculating means that calculate a mean value and a standard deviation from the extracted frequency amplitude; criterion calculating means that calculate a criterion from the calculated statistic; and determining means that determine whether there is an abnormality in the rotator by comparing the vibration waveform with the criterion.

CITATION LIST

Patent Literature

Patent Literature 1: Japanese Patent Application Laid-open No. 2004-362204

Patent Literature 2: Japanese Patent Application Laid-open No. 2012-8030

SUMMARY

Technical Problem

However, according to the conventional technique described in Patent Literature 1 mentioned above, a user needs to preset permissible values for the friction torque and the friction force to perform failure diagnosis. For that reason, there has been a problem in that some operation for determining the permissible value is required.

Further, according to the conventional technique described in Patent Literature 2 mentioned above, the criterion calculating means can calculate a criterion for determining an abnormality from vibration of the rotator machine. However, in order to achieve this, a vibration waveform of the bearing of the rotator, which is used to calculate the criterion, has to be stored in the vibration waveform database. For this reason, there has been a problem in that some operation for pre-storing the vibration waveform in the vibration waveform database is required.

The present invention has been made in view of the above circumstances, and an object of the present invention is to provide an electric motor control device that can easily derive a mechanical characteristic permissible threshold from a mechanical characteristic estimation value, and can detect a mechanical characteristic abnormality from the mechanical characteristic estimation value and the mechanical characteristic permissible threshold.

Solution to Problem

In order to solve the above-mentioned problems and achieve the object, the present invention provides an electric motor control device controlling an electric motor that drives a drive unit, the electric motor control device comprising: a command generation unit to output a drive command signal; an operation detection unit to detect a position or speed of the electric motor, and output an operation detection value; a drive control unit to receive the operation detection value, the drive command signal, and a drive current detection value, and output a drive control signal and a drive force signal; a current control unit to receive the drive control signal and output a drive current, and output the drive current detection value detected from the drive current; a mechanical characteristic estimation unit to receive at least the drive force signal, and output a mechanical characteristic estimation value; an integration unit to output an integrated drive time of the drive unit on the basis of a duration time during which the drive command signal is outputted, or to output a drive amount integrated value of the drive unit on the basis of a duration time during which the drive command signal is outputted; a mechanical characteristic permissible threshold output unit to receive the mechanical characteristic estimation value and a signal indicating a set period, and output a mechanical characteristic permissible threshold; a set period determination unit to receive the integrated drive time or the drive amount integrated value of the drive unit, and output the signal indicating a set period; and a mechanical characteristic abnormality detection unit to receive the mechanical characteristic permissible threshold and the mechanical characteristic estimation value, and detect a mechanical characteristic abnormality.

Advantageous Effects of Invention

The present invention has an advantageous effect that it is possible to provide an electric motor control device that can easily derive a mechanical characteristic permissible threshold from a mechanical characteristic estimation value, and can detect a mechanical characteristic abnormality from the mechanical characteristic estimation value and the mechanical characteristic permissible threshold.

DESCRIPTION OF EMBODIMENTS

Electric motor control devices according to embodiments of the present invention will be described below in detail with reference to the drawings. The present invention is not limited to these embodiments.

First Embodiment

Figure 1:
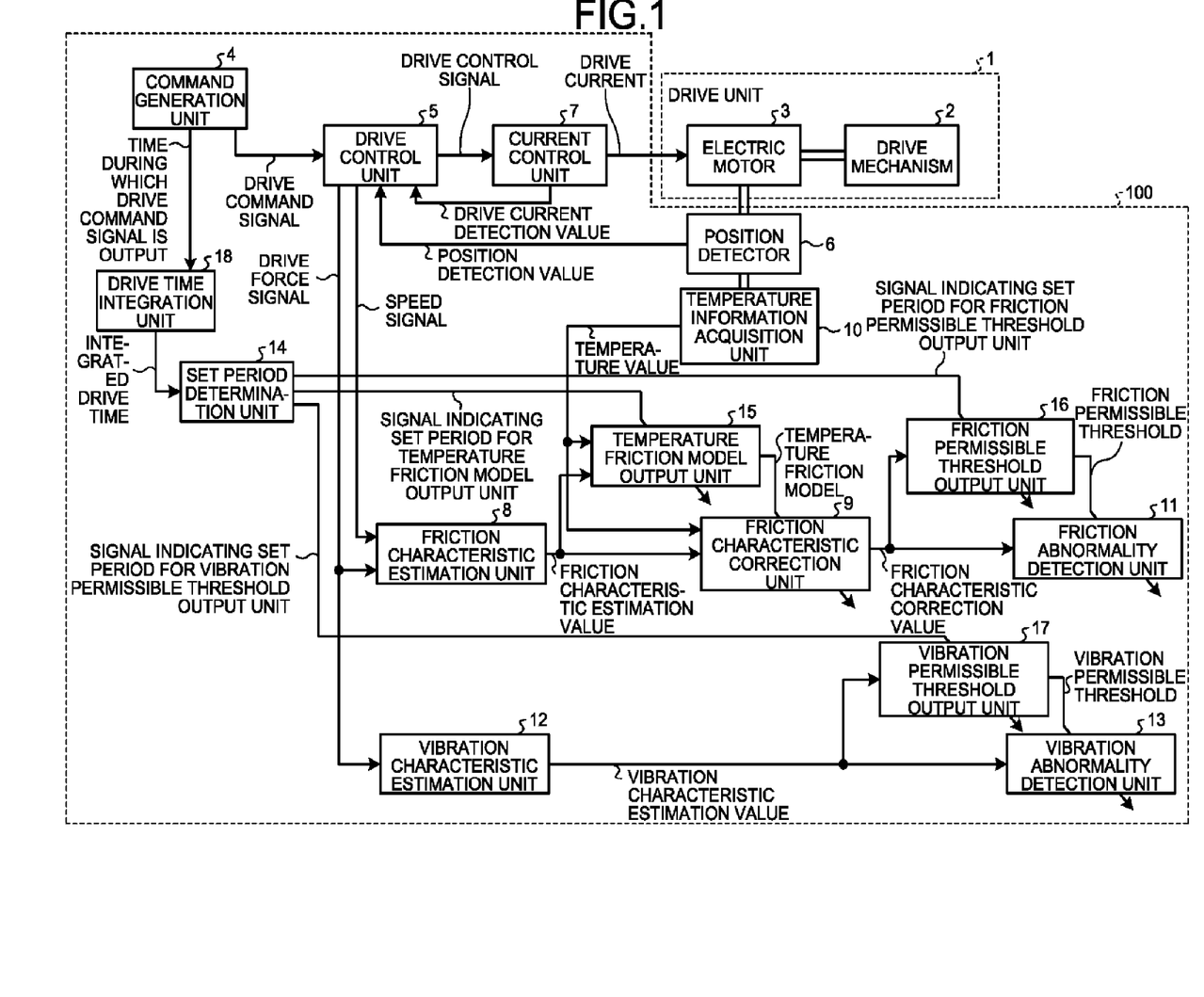
FIG. 1 is a block diagram illustrating an example configuration of an electric motor control device according to a first embodiment.

FIG. 1 is a block diagram illustrating an example configuration of an electric motor control device according to a first embodiment of the present invention. The electric motor control device 100 illustrated in FIG. 1 includes a command generation unit 4, a drive control unit 5, a position detector 6, a current control unit 7, a friction characteristic estimation unit 8, a friction characteristic correction unit 9, a temperature information acquisition unit 10, a friction abnormality detection unit 11, a vibration characteristic estimation unit 12, a vibration abnormality detection unit 13, a set period determination unit 14, a temperature friction model output unit 15, a friction permissible threshold output unit 16, a vibration permissible threshold output unit 17, and a drive time integration unit 18. The command generation unit 4 controls an electric motor 3 of a drive unit 1, and outputs a drive command signal and a duration time during which the drive command signal is outputted. The drive control unit 5 receives a position detection value, a drive command signal, and a drive current detection value as inputs thereof, and outputs a drive control signal, a speed signal, and a drive force signal. The position detector 6 detects a position of the electric motor 3, and outputs the position detection value. The current control unit 7 receives the drive control signal as an input thereof, and outputs a drive current, and further outputs the drive current detection value detected from the drive current. The friction characteristic estimation unit 8 receives the speed signal and the drive force signal as inputs thereof, and outputs a friction characteristic estimation value. The friction characteristic correction unit 9 receives a temperature value of the drive unit 1 and the friction characteristic estimation value as inputs thereof, and outputs a friction characteristic correction value made by correction using a temperature friction model. The temperature information acquisition unit 10 acquires and outputs the temperature value of the drive unit 1. The friction abnormality detection unit 11 receives a friction permissible threshold and the friction characteristic correction value as inputs thereof, and detects a friction abnormality. The vibration characteristic estimation unit 12 receives the drive force signal as an input thereof, and outputs a vibration characteristic estimation value. The vibration abnormality detection unit 13 receives the vibration characteristic estimation value and a vibration permissible threshold as inputs thereof, and detects a vibration abnormality. The set period determination unit 14 receives an integrated drive time of the drive unit 1 as an input thereof, and outputs a signal indicating a set period for each of the temperature friction model output unit 15, the friction permissible threshold output unit 16, and the vibration permissible threshold output unit 17. The temperature friction model output unit 15 receives the temperature value, the friction characteristic estimation value, and the signal indicating a set period for the temperature friction model output unit as inputs thereof, and outputs the temperature friction model. The friction permissible threshold output unit 16 receives the friction characteristic correction value and the signal indicating a set period for the friction permissible threshold output unit as inputs thereof, and outputs the friction permissible threshold. The vibration permissible threshold output unit 17 receives the vibration characteristic estimation value and the signal indicating a set period for the vibration permissible threshold output unit as inputs thereof, and outputs the vibration permissible threshold. The drive time integration unit 18 receives the duration time during which the drive command signal is outputted, as an input thereof, and outputs the integrated drive time. On the other hand, the drive unit 1 is composed of a drive mechanism 2 and the electric motor 3. Here, the drive mechanism 2 may be a linear motion guide, for example.

The temperature friction model for the friction characteristic correction unit 9 is calculated and set by the temperature friction model output unit 15. The friction permissible threshold for the friction abnormality detection unit 11 is calculated and set by the friction permissible threshold output unit 16. The vibration permissible threshold of the vibration abnormality detection unit 13 is calculated and set by the vibration permissible threshold output unit 17. Further, the friction abnormality detection unit 11 detects a friction abnormality after the friction permissible threshold is set therein. The vibration abnormality detection unit 13 detects a vibration abnormality after the vibration permissible threshold is set.

In FIG. 1, it is noted that an arrow diagonally intersecting with each block of the friction characteristic correction unit 9, the friction abnormality detection unit 11, the vibration abnormality detection unit 13, the temperature friction model output unit 15, the friction permissible threshold output unit 16, and the vibration permissible threshold output unit 17 means to be able to change an internal set value of each block. This is also true in the other drawings.

Further, the temperature value acquired by the temperature information acquisition unit 10 may be a temperature of the drive unit 1, or may be a temperature of any part whose temperature is changed along with the temperature of the drive unit 1. Here, the part whose temperature is changed along with the temperature of the drive unit 1 can be the position detector 6, for example.

Next, an explanation will be given of an operation of the electric motor control device 100 illustrated in FIG. 1. First, a drive command signal is outputted from the command generation unit 4, a drive control signal is outputted from the drive control unit 5 receiving the drive command signal, and a drive current is supplied to the electric motor 3 from the current control unit 7 receiving the drive control signal, whereby the electric motor 3 of the drive unit 1 is controlled, and the drive unit 1 is driven. The position detector 6 detects a position in the electric motor 3, and outputs a position detection value. The drive control unit 5 outputs a drive control signal calculated from the drive command signal and the position detection value by performing arithmetical operations, such as addition, multiplication, differential, and/or integration. The current control unit 7 outputs a drive current calculated from the drive control signal, and then the drive unit 1 is driven by the drive command signal.

Note that influences of friction and vibration caused at the time of driving in the drive mechanism 2 and electric motor 3 included in the drive unit 1 are contained in the position detection value. Further, components of the friction and vibration are also contained in a drive current detection value calculated by the current control unit 7 from the drive control signal calculated in accordance with the position detection value. In this situation, the friction characteristic estimation unit 8 estimates a characteristic of friction caused in the drive unit 1 based on a drive force signal calculated from the drive current detection value and a speed signal calculated from the position detection value, and the vibration characteristic estimation unit 12 estimates the characteristic of vibration caused in the drive unit 1 based on the drive force signal calculated from the drive current detection value.

The friction characteristic estimation unit 8 approximates the characteristic of friction caused in the drive unit 1 into a linear expression composed of a term including a viscosity coefficient that is a coefficient of speed, and a constant term, and derives the viscosity coefficient and the constant term from the drive force signal and the speed signal in an approximation method thereby to estimate the characteristic of friction caused in the drive unit 1, so as to output a friction characteristic value with respect to the viscosity coefficient and a predetermined speed as a friction characteristic estimation value. Here, the approximation method can be a least-squares method, for example.

However, the characteristic of friction caused in the drive unit 1 may vary depending on temperature. In this case, the friction characteristic estimation value also has temperature dependence. Therefore, using a temperature value acquired by the temperature information acquisition unit 10 and a temperature friction model made by modeling the temperature dependence of friction, the friction characteristic correction unit 9 corrects the friction characteristic estimation value, and outputs a friction characteristic correction value. This temperature friction model is expressed by a linear expression composed of a term using temperature as a parameter, and a constant term.

The friction abnormality detection unit 11 compares the friction characteristic correction value with the friction permissible threshold thereby to detect presence or absence of an abnormality of friction caused in the drive unit 1 with performing compensation of the temperature influence on friction.

The vibration characteristic estimation unit 12 removes a signal component used for driving the drive unit 1 and an offset component from the drive force signal by using a high-pass filter thereby to extract a vibration component caused in the drive unit 1. Then, the vibration characteristic estimation unit 12 estimates the amplitude of vibration caused in the drive unit 1 by averaging absolute values of the extracted vibration component, and outputs a vibration characteristic estimation value.

The vibration abnormality detection unit 13 compares the vibration characteristic estimation value with the vibration permissible threshold thereby to detect an abnormality of vibration caused in the drive unit 1.

As described above, the detection of a friction abnormality performed by the friction abnormality detection unit 11 and the detection of a vibration abnormality performed by the vibration abnormality detection unit 13 require the friction permissible threshold and the vibration permissible threshold. Further, the output of the friction characteristic correction value to be inputted to the friction abnormality detection unit 11 requires the temperature correction performed by the friction characteristic correction unit 9, and this temperature correction requires the temperature friction model. Here, an explanation will be given for an operation of automatically setting the friction permissible threshold, the vibration permissible threshold, and the temperature friction model.

The drive time integration unit 18 integrates the duration time during which the command generation unit 4 outputs the drive command signal, i.e., integrates a time during which the drive unit 1 is in a driving operation to calculate and output an integrated drive time. Using the integrated drive time outputted by the drive time integration unit 18, the set period determination unit 14 determines periods, in which the temperature friction model output unit 15, the friction permissible threshold output unit 16, and the vibration permissible threshold output unit 17 calculate the temperature friction model, the friction permissible threshold, and the vibration permissible threshold, respectively, and set these calculation results in the friction characteristic correction unit 9, the friction abnormality detection unit 11, and the vibration abnormality detection unit 13, respectively. Each of these periods is a period with respect to the integrated drive time, and is assumed to be a period equal to or smaller than the shortest basic rating life among basic rating lives of components of the electric motor 3 and the drive mechanism 2. Here, the basic rating life is defined as a rating life when a degree of reliability is 90%. Where the integrated drive time is equal to or smaller than the basic rating life, since condition is normal when the degree of reliability of the drive unit 1 is 90% or more, the integrated drive time is suitable as a period for setting each of the temperature friction model, the friction permissible threshold, and the vibration permissible threshold. Further, this basic rating life represents deterioration and service life statistically using the Weibull distribution as one example. Accordingly, the degree of reliability may be changed to determine the period for calculating and setting each of the temperature friction model, the friction permissible threshold, and the vibration permissible threshold, such that the period is equal to or smaller than the rating life at the degree of reliability being 99% or 99.9%, for example.

In the set period for the temperature friction model output unit determined by the set period determination unit 14, the temperature friction model output unit 15 operates to store temperature values and friction characteristic estimation values in the case of acquiring a plurality of different temperature values on the basis of the temperature value outputted by the temperature information acquisition unit 10 and the friction characteristic estimation value outputted by the friction characteristic estimation unit 8, and to create a temperature friction model using an approximation method on the basis of the relation between the stored temperature values and the stored friction characteristic estimation values and set the temperature friction model in the friction characteristic correction unit 9. Here, the approximation method can be a least-squares method, for example.

In the set period for the friction permissible threshold, the friction permissible threshold output unit 16 operates to calculate the mean value and standard deviation of a friction characteristic correction value obtained by compensation for the influence of temperature dependence of friction by means of the temperature friction model, and to calculate a friction permissible threshold on the basis of the clean value and standard deviation of the friction characteristic correction value to output the friction permissible threshold to the friction abnormality detection unit 11.

Here, the friction permissible threshold can be expressed by "the mean value±the standard deviation×a coefficient". The coefficient for the friction permissible threshold can be determined based on a standard normal distribution. For example, in the case where a friction characteristic correction value whose occurrence probability is lower than 0.3% is wanted to be detected as an abnormality, the coefficient for the friction permissible threshold is set to 2.97. Further, for example, in the case where a friction characteristic correction value whose occurrence probability is lower than 0.03% is wanted to be detected as an abnormality, the coefficient is set to 3.62.

The vibration permissible threshold output unit 17 calculates a vibration permissible threshold on the basis of the mean value and standard deviation calculated from the vibration characteristic estimation value outputted by the vibration characteristic estimation unit 12 in the set period for the vibration permissible threshold output unit 17, and outputs the vibration permissible threshold to the vibration abnormality detection unit 13. When the vibration permissible threshold is calculated by "the mean value±the standard deviation×a coefficient", the coefficient for the vibration permissible threshold can be determined as with the friction permissible threshold.

As described above, in a period in which the drive unit 1 is normal, that is determined by the drive time integration unit 18 and the set period determination unit 14, an operation is performed to set the temperature friction model, the friction permissible threshold, and the vibration permissible threshold that are necessary to detect an abnormality on the basis of the friction characteristic estimation value and the vibration characteristic estimation value. By doing so, the friction permissible threshold and the vibration permissible threshold set in the period of the drive unit 1 being normal can be compared with estimation results of friction and vibration currently caused in the drive unit 1, so that abnormality of the friction and vibration currently caused in the drive unit 1 can be detected.

Here, it is sufficient that the set period determined by the set period determination unit 14 is equal to or smaller than a basic rating life of each component of the electric motor 3 and the drive mechanism 2. Accordingly, the set periods may be a period to be set in accordance with a trial operation period for start-up of the mechanical device including the electric motor 3 and the drive mechanism 2, or a running-in operation period after parts replacement of the mechanical device.

Further, in the first embodiment, the drive time integration unit 18 calculates an integrated drive time by integrating the duration time during which the command generation unit 4 outputs the drive command signal, but the present invention is not limited to this manner. The drive time integration unit 18 may calculate an integrated drive time by integrating the number of times the command generation unit 4 outputs the drive command signal.

In addition, the drive force signal outputted by the drive control unit 5 may be calculated from the drive current detection value outputted by the current control unit 7, or may be calculated from the drive control signal.

Further, in the first embodiment, the temperature information acquisition unit 10 is attached to the position detector 6, but the present invention is not limited to this manner. When the position detector 6 has a temperature detection unit, the temperature information acquisition unit 10 may be substituted with this temperature detection unit. Further, the temperature information acquisition unit 10 may be attached to the drive unit 1 to directly acquire the temperature of the drive unit 1, or may be attached to another portion whose temperature changes in accordance with the temperature of the drive unit 1.

Further, an explanation has been given here of a configuration equipped with the position detector 6 for detecting the position in the electric motor 3, but the present invention is not limited to this manner.

Figure 2:
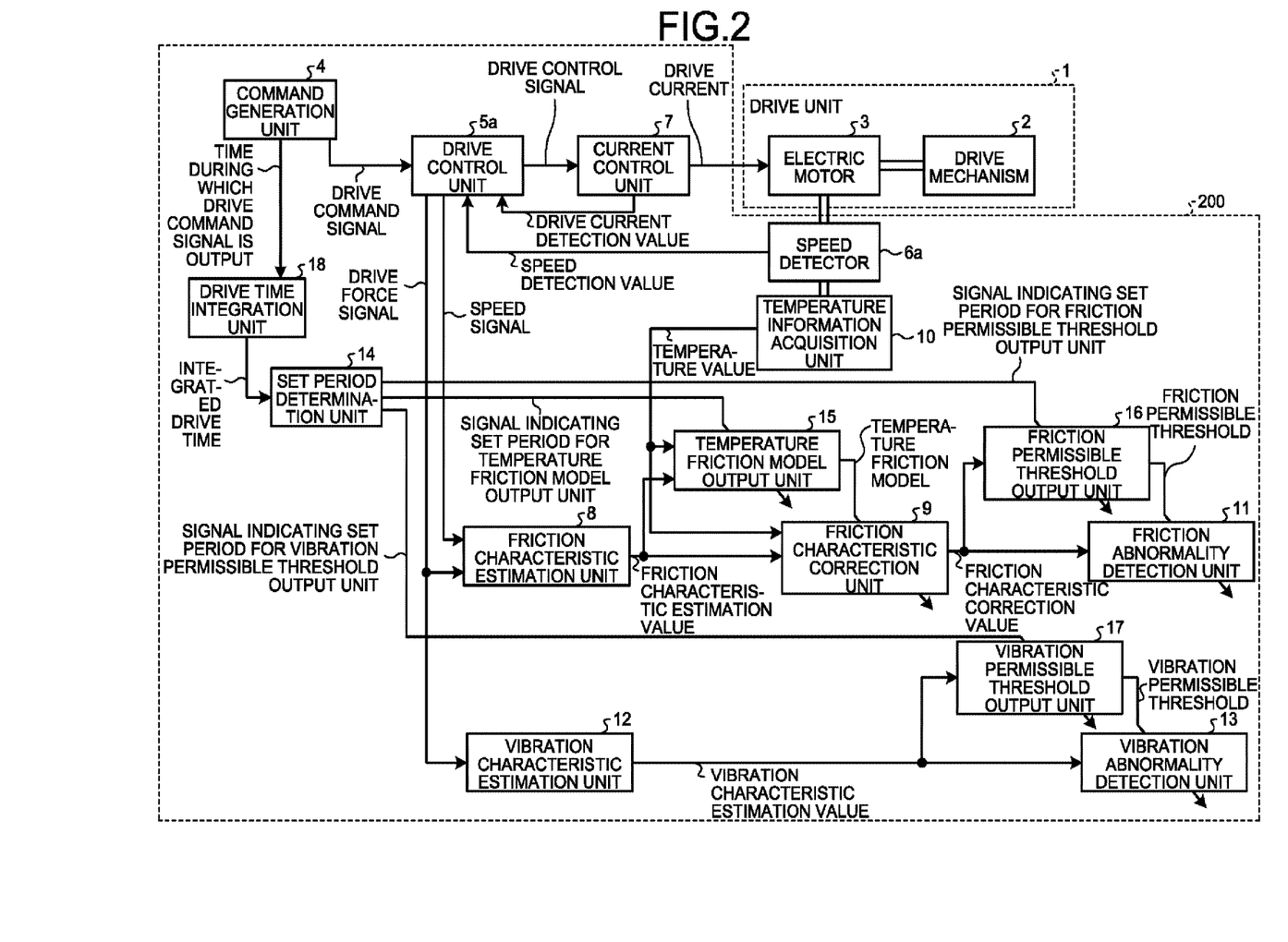
FIG. 2 is a block diagram illustrating another example configuration of an electric motor control device according to the first embodiment.

FIG. 2 is a block diagram illustrating another example configuration of an electric motor control device according to the first embodiment of the present invention. The electric motor control device 200 illustrated in FIG. 2 differs from the electric motor control device 100 illustrated in FIG. 1, only in that the electric motor control device 200 includes a speed detector 6a detecting a speed of the electric motor 3 in place of the position detector 6 of the device 100, and a drive control unit 5a receiving an input of a speed detection value as an input thereof in place of the drive control unit 5 receiving a position detection value as an input thereof. The other components denoted by the same reference symbols as those of FIG. 1 are the same as those described above, and thus their description will be omitted. In this configuration, the drive control unit 5a receives a speed detection value outputted by the speed detector 6a as an input thereof and a drive command signal outputted by the command generation unit 4 as another input thereof, and the drive control unit 5a outputs a drive control signal.

As described with reference to FIGS. 1 and 2, it is sufficient that the drive control unit receives a position detection value or speed detection value that is an operation detection value detected by the drive unit as an input thereof. Hereinafter, the position detector 6 and the speed detector 6a outputting an operation detection value are collectively referred to as an "operation detection unit". Further, in the first embodiment, an explanation has been given for the case where the friction characteristic and the vibration characteristic are used as mechanical characteristics for an example, but the present invention is not limited to this manner.

As described above, according to the first embodiment, there is no need to perform either of an operation for determining the permissible value and an operation for pre-storing the vibration waveform into the vibration waveform database. Accordingly, it is possible to easily derive a friction characteristic permissible threshold from a friction characteristic estimation value, and to easily derive a vibration characteristic permissible threshold from a vibration characteristic estimation value. That is, it is possible to provide an electric motor control device that can easily derive a mechanical characteristic permissible threshold from a mechanical characteristic estimation value, to detect a mechanical characteristic abnormality from the mechanical characteristic estimation value and the mechanical characteristic permissible threshold.

Second Embodiment

Figure 3:
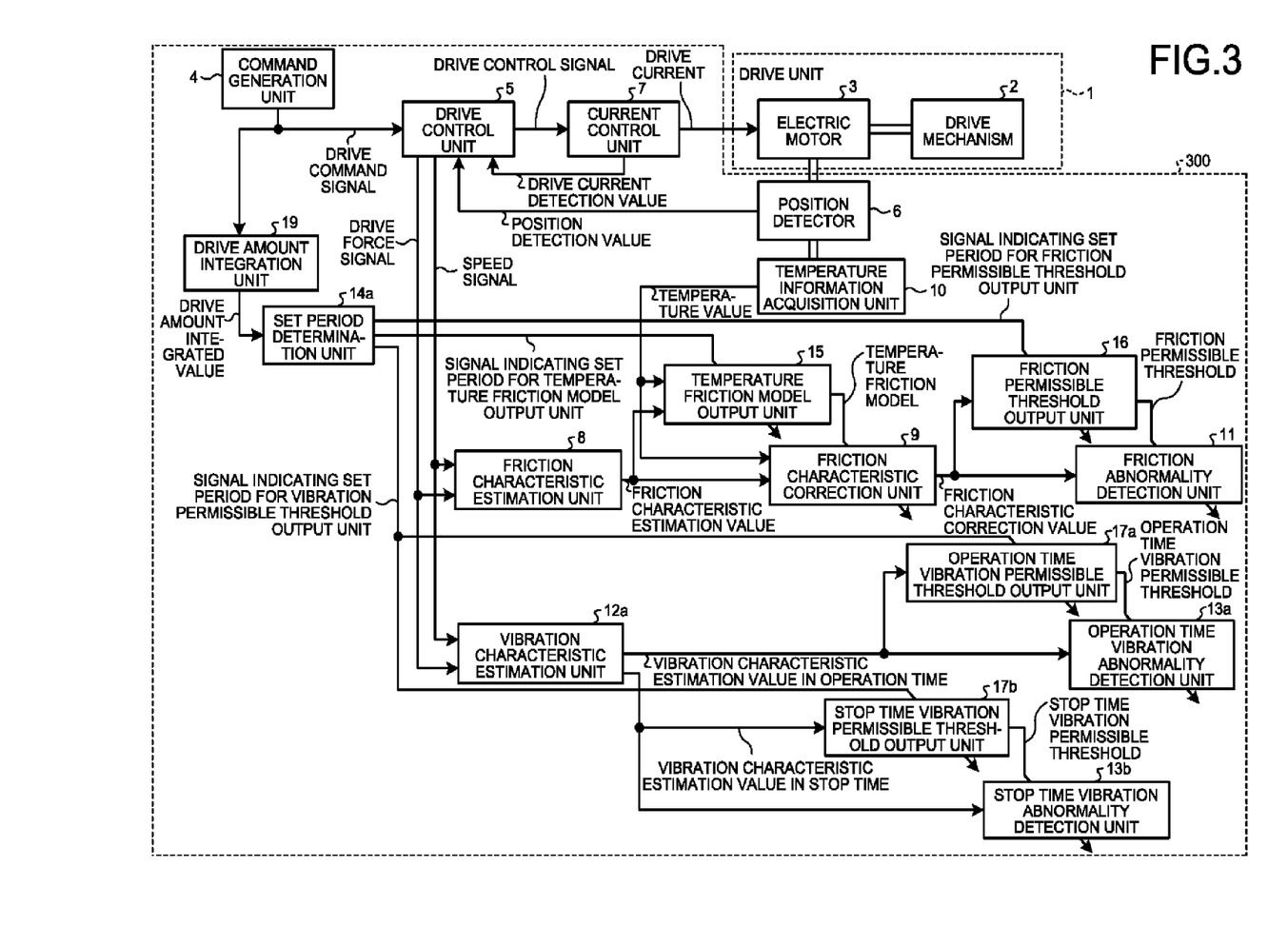
FIG. 3 is a block diagram illustrating an example configuration of an electric motor control device according to a second embodiment.

FIG. 3 is a block diagram illustrating an example configuration of an electric motor control device according to a second embodiment of the present invention. The electric motor control device 300 illustrated in FIG. 3 differs from the electric motor control device 100 illustrated in FIG. 1, in that the electric motor control device 300 includes: a drive amount integration unit 19 receiving a drive command signal as an input thereof and outputting a drive amount integrated value in place of the drive time integration unit 18; a vibration characteristic estimation unit 12a receiving a drive force signal and a speed signal as inputs thereof and outputting a vibration characteristic estimation value during operation and a vibration characteristic estimation value during stoppage in place of the vibration characteristic estimation unit 12; an operation time vibration abnormality detection unit 13a and a stop time vibration abnormality detection unit 13b in place of the vibration abnormality detection unit 13; an operation time vibration permissible threshold output unit 17a and a stop time vibration permissible threshold output unit 17b in place of the vibration permissible threshold output unit 17; and a set period determination unit 14a in place of the set period determination unit 14, which receives the drive amount integrated value as an input thereof, and outputs a signal indicating a set period for each of the temperature friction model output unit 15, the friction permissible threshold output unit 16, the operation time vibration permissible threshold output unit 17a, and the stop time vibration permissible threshold output unit 17b. The other components denoted by the same reference symbols as those of FIG. 1 are the same as those described above in FIG. 1, and thus their description will be omitted.

Next, an explanation will be given for an operation of the electric motor control device 300 illustrated in FIG. 3. In the electric motor control device 300 illustrated in FIG. 3, the vibration characteristic estimation unit 12a discriminates between an operation time and a stop time of the drive unit 1 on the basis of the speed signal outputted by the drive control unit 5, and extracts a vibration component caused in the drive unit 1 by removing a signal component used for driving the drive unit 1 and an offset component from the drive force signal using a high-pass filter. Then, the vibration characteristic estimation unit 12a estimates the amplitude of vibration caused in the drive unit 1 by averaging the absolute values of the extracted vibration component, and outputs a vibration characteristic estimation value during operation of the drive unit 1 and a vibration characteristic estimation value during stoppage of the drive unit 1.

The operation time vibration permissible threshold output unit 17a calculates and outputs an operation time vibration permissible threshold with respect to the vibration characteristic estimation value in the operation time of the drive unit 1. The stop time vibration permissible threshold output unit 17b calculates and outputs a stop time vibration permissible threshold with respect to the vibration characteristic estimation value in the stop time of the drive unit 1. The operation time vibration abnormality detection unit 13a compares the vibration characteristic estimation value in the operation time with the operation time vibration permissible threshold thereby to detect an abnormality of vibration caused in the operation time of the drive unit 1. The stop time vibration abnormality detection unit 13b compares the vibration characteristic estimation value in the stop time with the stop time vibration permissible threshold thereby to detect an abnormality of vibration caused in the stop time of the drive unit 1.

The drive amount integration unit 19 integrates the drive amount of the drive unit 1 from the drive command signal, and outputs a drive amount integrated value. Here, the drive amount of the drive unit 1 can be the movement amount of the drive mechanism 2 and the number of revolution times of the electric motor 3, for example.

By using the drive amount integrated value outputted by the drive amount integration unit 19, the set period determination unit 14a determines: a period in which the friction permissible threshold output unit 16 calculates the friction permissible threshold and sets the friction permissible threshold in the friction abnormality detection unit 11; a period in which the operation time vibration permissible threshold output unit 17a calculates the operation time vibration permissible threshold and sets the operation time vibration permissible threshold in the operation time vibration abnormality detection unit 13a; and a period in which the stop time vibration permissible threshold output unit 17b calculates the stop time vibration permissible threshold and sets the stop time vibration permissible threshold in the stop time vibration abnormality detection unit 13b. Each of these periods is a period with respect to the drive amount integrated value, which is determined on the basis of the smallest value among the drive amounts that reach the basic rating lives of the components of the electric motor 3 and the drive mechanism 2, and is a period equal to or shorter than the period reaching this smallest value. Here, the basic rating life is defined as a rating life when a degree of reliability is 90%, as in the first embodiment. Where the drive amount integrated value is equal to or smaller than the drive amount reaching the basic rating life, since condition is normal when the degree of reliability of the drive unit 1 is 90% or more. Thus, the drive amount integrated value is suitable as a period for setting each of the temperature friction model, the friction permissible threshold, and the vibration permissible threshold.

Then, the temperature friction model output unit 15, the friction permissible threshold output unit 16, the operation time vibration permissible threshold output unit 17a, and the stop time vibration permissible threshold output unit 17b calculate a temperature friction model, a friction permissible threshold, an operation time vibration permissible threshold, and a stop time vibration permissible threshold, in their respective set periods. Consequently, the friction abnormality detection unit 11 can detect an abnormality with respect to the friction characteristic correction value, and the vibration abnormality detection unit 13 can detect an abnormality with respect to the vibration characteristic estimation value in the operation time and the vibration characteristic estimation value in the stop time.

As described above in the second embodiment, in a period of the drive unit 1 being normal, determined by the drive amount integration unit 19 and the set period determination unit 14a, an operation is performed to set the temperature friction model, the friction permissible threshold, the operation time vibration permissible threshold, and the stop time vibration permissible threshold, which are necessary to detect an abnormality based on the friction characteristic estimation value and the vibration characteristic estimation value. By virtue of this operation, the friction permissible threshold, the operation time vibration permissible threshold, and the stop time vibration permissible threshold set in the period of the drive unit 1 being normal can be compared with estimation results of friction and vibration caused in the drive unit 1, and thus an abnormality can be detected in the friction and vibration caused in the drive unit 1.

Further, for the vibration characteristic estimation value according to the second embodiment, the operation time is discriminated from the stop time of the drive unit 1 are discriminated. Consequently, in the case where the vibration characteristic estimation value in the operation time of the drive unit 1 exceeds the operation time vibration permissible threshold, when the vibration characteristic estimation value in the stop time of the drive unit 1 does not exceed the stop time vibration permissible threshold, it can be detected that an abnormality is caused in the drive unit 1 and when the vibration characteristic estimation value in the stop time of the drive unit 1 exceeds the stop time vibration permissible threshold, it can be detected that an abnormality is caused in the control system.

Here, it is sufficient that each of the set periods determined by the set period determination unit 14a is equal to or smaller than the basic rating lives of the components of the electric motor 3 and the drive mechanism 2. Thus, each of the set periods may be a period to be set in accordance with a drive amount in a trial operation period for start-up of the mechanical device including the electric motor 3 and the drive mechanism 2, or a drive amount in a running-in operation period after parts replacement of the mechanical device.

Further, in the second embodiment, the drive amount integration unit 19 calculates a drive amount integrated value from the drive command signal outputted by the command generation unit 4, but the present invention is not limited to this manner. The drive amount integration unit 19 may calculate a drive amount integrated value by integrating the number of times the command generation unit 4 outputs the drive command signal, or may calculate a drive amount integrated value from a position detection value outputted by the position detector 6.

As described above, also according to the second embodiment, there is no need to perform either of an operation for determining the permissible value and an operation for pre-storing the vibration waveform into the vibration waveform database. Accordingly, it is possible to provide an electric motor control device that can easily derive a mechanical characteristic permissible threshold from a mechanical characteristic estimation value, to detect a mechanical characteristic abnormality from the mechanical characteristic estimation value and the mechanical characteristic permissible threshold. Further, according to the second embodiment, it is possible to discriminatively determine whether the detected abnormality is an abnormality caused in the drive unit or an abnormality caused in the control system.

Third Embodiment

Figure 4:
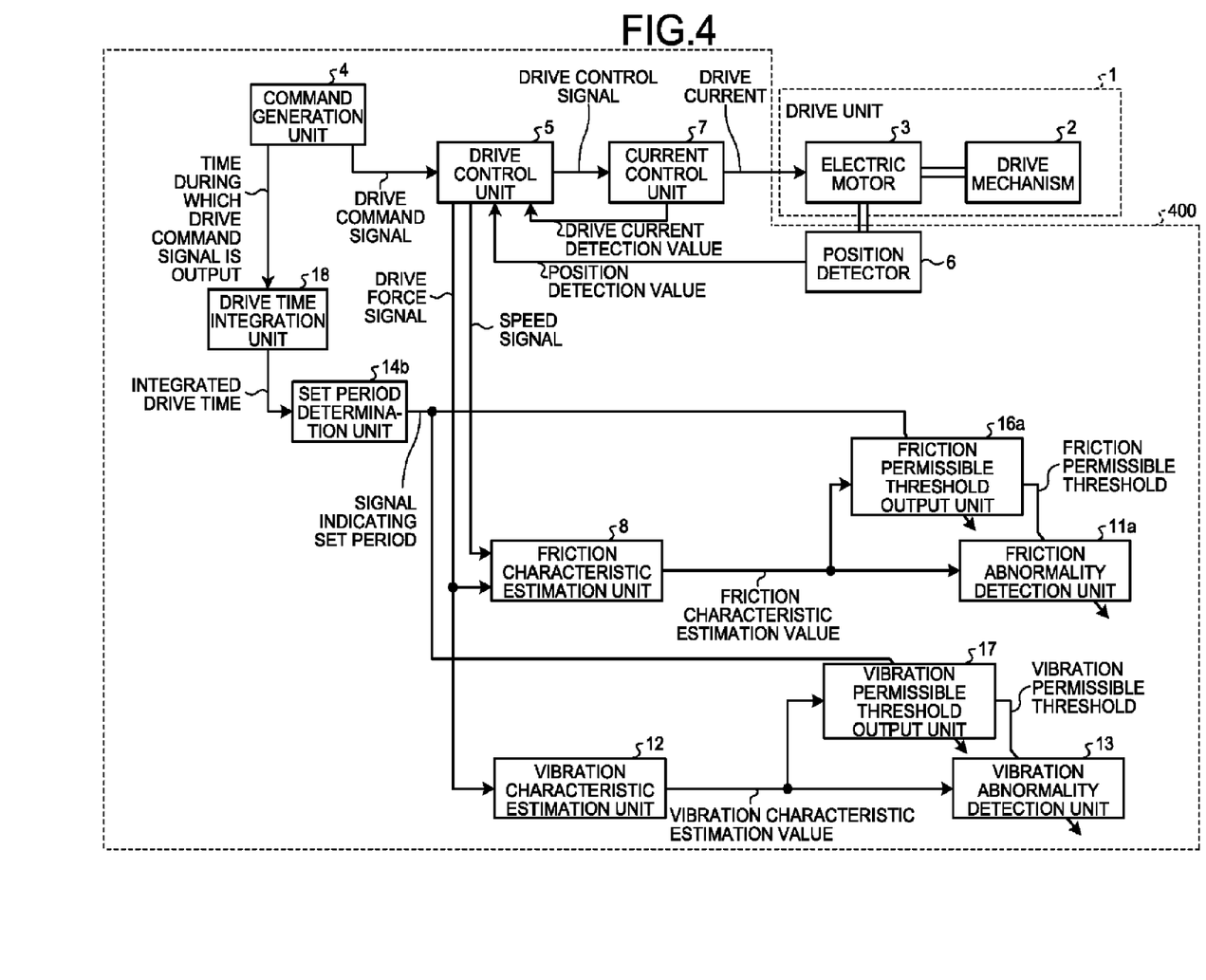
FIG. 4 is a block diagram illustrating an example configuration of an electric motor control device according to a third embodiment.

FIG. 4 is a block diagram illustrating an example configuration of an electric motor control device according to a third embodiment of the present invention. The electric motor control device 400 illustrated in FIG. 4 differs from the electric motor control device 100 illustrated in FIG. 1, in that the electric motor control device 400 excludes the friction characteristic correction unit 9, the temperature information acquisition unit 10, and the temperature friction model output unit 15, and includes: a set period determination unit 14b receiving an integrated drive time of the drive unit 1 as an input thereof and outputting a signal indicating a set period common to both of a friction permissible threshold output unit 16a and the vibration permissible threshold output unit 17 in place of the set period determination unit 14; the friction permissible threshold output unit 16a receiving a friction characteristic estimation value and a signal indicating a set period as inputs thereof and outputting a friction permissible threshold in place of the friction permissible threshold output unit 16; and a friction abnormality detection unit 11a receiving the friction permissible threshold and the friction characteristic estimation value as inputs thereof and detecting a friction abnormality in place of the friction abnormality detection unit 11. In the set period for the friction permissible threshold determined by the set period determination unit 14b, the friction permissible threshold output unit 16a calculates a friction permissible threshold, and outputs the friction permissible threshold to the friction abnormality detection unit 11a. The friction abnormality detection unit 11a compares the friction characteristic estimation value with the friction permissible threshold thereby to detect an abnormality in friction caused in the drive unit 1. The other components denoted by the same reference symbols as those of FIG. 1 are the same as those described above in FIG. 1, and thus their description will be omitted.

By using the integrated drive time outputted by the drive time integration unit 18, the set period determination unit 14b determines a period in which the friction permissible threshold output unit 16a calculates the friction permissible threshold and sets the friction permissible threshold in the friction abnormality detection unit 11a, and a period in which the vibration permissible threshold output unit 17 calculates the vibration permissible threshold and sets the vibration permissible threshold in the vibration abnormality detection unit 13. Each of these periods is a period with respect to the integrated drive time, and is set to be a period equal to or smaller than the shortest value among the basic rating lives of the components of the electric motor 3 and the drive mechanism 2. Here, the basic rating life is defined as a rating life when a degree of reliability is 90%, as in the first embodiment. Where the integrated drive time is equal to or smaller than the basic rating life, since condition is normal when the degree of reliability of the drive unit 1 is 90% or more, the integrated drive time is suitable as a period for setting each of the friction permissible threshold and the vibration permissible threshold.

In the set period for the friction permissible threshold determined by the set period determination unit 14b, the friction permissible threshold output unit 16a operates to calculate the mean value and standard deviation of the friction characteristic estimation value, and to calculate a friction permissible threshold on the basis of the mean value and standard deviation of the friction characteristic estimation value to output the friction permissible threshold to the friction abnormality detection unit 11a. Where the friction permissible threshold is calculated as "the mean value±the standard deviation×a coefficient", the coefficient for the friction permissible threshold can be determined in the same manner as in the first embodiment.

In the set period for the vibration permissible threshold, the vibration permissible threshold output unit 17 calculates a vibration permissible threshold on the basis of the mean value and standard deviation calculated from the vibration characteristic estimation value outputted by the vibration characteristic estimation unit 12, and outputs the vibration permissible threshold to the vibration abnormality detection unit 13. Where the vibration permissible threshold is calculated as "the mean value±the standard deviation×a coefficient", the coefficient for the vibration permissible threshold can be determined in the same manner as in the first embodiment.

As described above in the third embodiment, in a period of the drive unit 1 being normal, determined by the drive time integration unit 18 and the set period determination unit 14b, an operation is performed to set the friction permissible threshold and the vibration permissible threshold which are necessary to detect an abnormality based on the friction characteristic estimation value and the vibration characteristic estimation value. By so doing, the friction permissible threshold and vibration permissible threshold set in the period of the drive unit 1 being normal can be compared with estimation results of friction and vibration caused in the drive unit 1, and thus it is possible to detect an abnormality in the friction and vibration caused in the drive unit 1.

Further, since the electric motor control device according to the third embodiment does not perform a computing operation for the temperature dependence of friction, the calculation cost can be reduced. The electric motor control device according to the third embodiment is assumed to be utilized in an environment where temperature variation is small, such as an environment where ambient temperature is under control, in which there is no need to consider the temperature dependence of friction.

Here, it is sufficient that each of the set periods determined by the set period determination unit 14b is equal to or smaller than the basic rating lives of the components of the electric motor 3 and the drive mechanism 2. Thus, each of the set periods may be a period to be set in accordance with a trial operation period for start-up of the mechanical device including the electric motor 3 and the drive mechanism 2, or a running-in operation period after parts replacement of the mechanical device. Further, in this embodiment, the period for the friction permissible threshold output unit 16a to calculate the friction permissible threshold and the period for the vibration permissible threshold output unit 17 to calculate the vibration permissible threshold are set as a common period, but these periods may be set as different periods as in the first and second embodiments.

Further, the electric motor control device according to the third embodiment may include the drive amount integration unit 19 outputting a drive amount integrated value in place of the drive time integration unit 18 as in the second embodiment. In the case where the control device includes the drive amount integration unit 19, each of the set periods determined by the set period determination unit 14b only has to be determined on the basis of a drive amount integrated value.

As described above, also according to the third embodiment, there is no need to perform either of an operation for determining the permissible value and an operation for pre-storing the vibration waveform into the vibration waveform database. Accordingly, it is possible to provide an electric motor control device that can easily derive a mechanical characteristic permissible threshold from a mechanical characteristic estimation value, to detect a mechanical characteristic abnormality from the mechanical characteristic estimation value and the mechanical characteristic permissible threshold. Further, according to the third embodiment, it is possible to reduce the calculation cost in an environment where the temperature variation is small.

Fourth Embodiment

Figure 5:
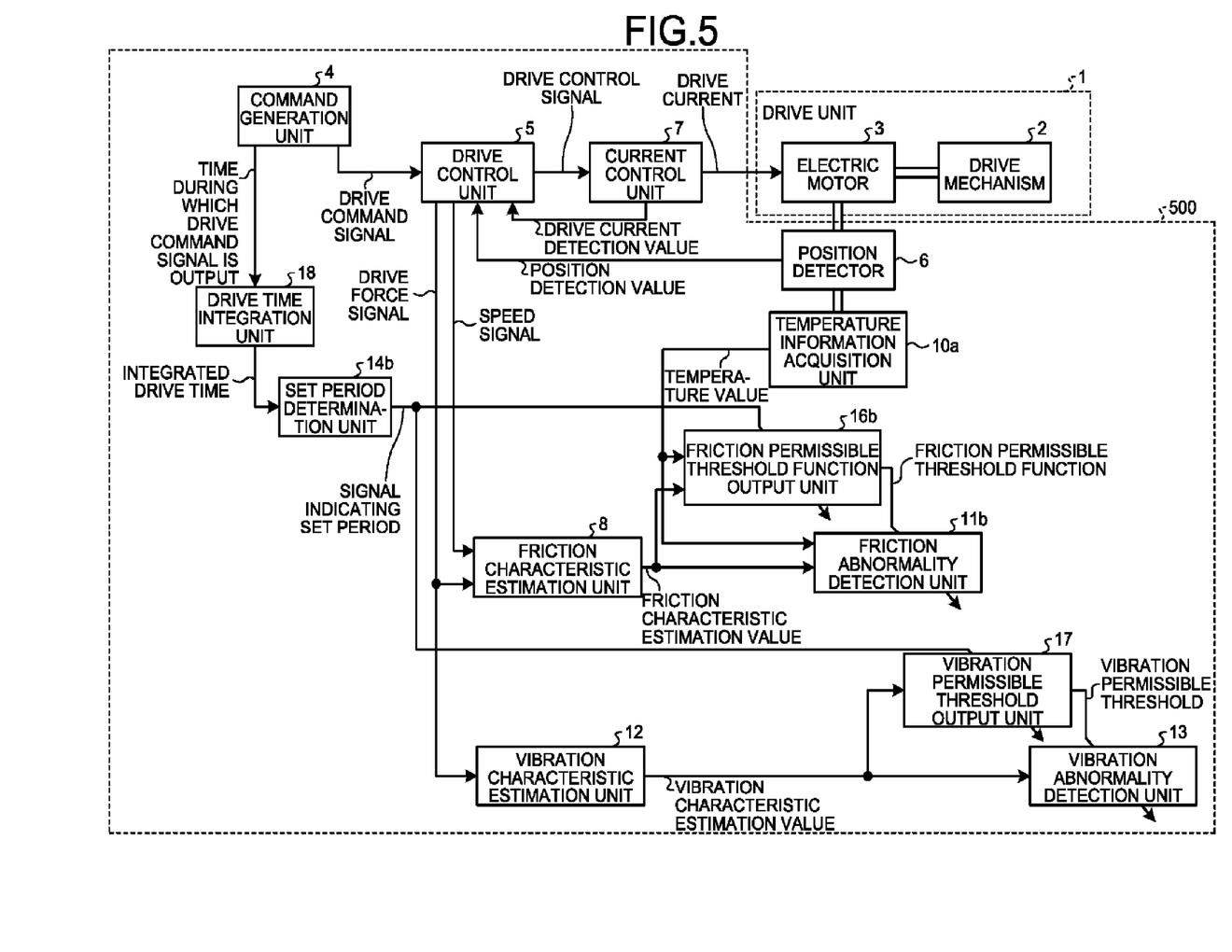
FIG. 5 is a block diagram illustrating an example configuration of an electric motor control device according to a fourth embodiment.

FIG. 5 is a block diagram illustrating an example configuration of an electric motor control device according to a fourth embodiment of the present invention. The electric motor control device 500 illustrated in FIG. 5 differs from the electric motor control device 400 illustrated in FIG. 4, in that the electric motor control device 500 includes: a temperature information acquisition unit 10a; a friction abnormality detection unit 11b in place of the friction abnormality detection unit 11a; and a friction permissible threshold function output unit 16b in place of the friction permissible threshold output unit 16a. The other components denoted by the same reference symbols as those of FIG. 4 are the same as those described above in FIG. 4, and thus their description will be omitted.

Next, an explanation will be given for an operation of the electric motor control device 500 illustrated in FIG. 5. In the electric motor control device 500 illustrated in FIG. 5, the friction characteristic estimation unit 8 receives a speed signal and a drive force signal as inputs thereof, and estimates a friction characteristic of the drive unit 1 to output a friction characteristic estimation value. The friction abnormality detection unit 11b receives a temperature value outputted by the temperature information acquisition unit 10a, the friction characteristic estimation value, and a friction permissible threshold function as inputs thereof, and compares the friction characteristic estimation value with the friction permissible threshold function thereby to detect an abnormality of friction caused in the drive unit 1. The vibration abnormality detection unit 13 receives a vibration characteristic estimation value and a vibration permissible threshold as inputs thereof, and detects an abnormality of vibration caused in the drive unit 1. In order for the friction abnormality detection unit 11b and the vibration abnormality detection unit 13 to detect an abnormality with respect to the friction and vibration caused in the drive unit 1, the friction permissible threshold function and the vibration permissible threshold are required to be set therein.

By using the integrated drive time outputted by the drive time integration unit 18, the set period determination unit 14b determines a period in which the friction permissible threshold function output unit 16b calculates the friction permissible threshold function and sets the friction permissible threshold function in the friction abnormality detection unit 11b, and a period in which the vibration permissible threshold output unit 17 calculates the vibration permissible threshold and sets the vibration permissible threshold in the vibration abnormality detection unit 13. Each of these periods is a period with respect to the integrated drive time, and is set to be a period equal to or smaller than the shortest value among the basic rating lives of the components of the electric motor 3 and the drive mechanism 2. Here, the basic rating life is defined as a rating life when a degree of reliability is 90% as with the first embodiment. Where the integrated drive time is equal to or smaller than the basic rating life, since condition is normal when the degree of reliability of the drive unit 1 is 90% or more, the integrated drive time is suitable as a period for setting each of the friction permissible threshold function and the vibration permissible threshold.

In the set period for the friction permissible threshold function determined by the set period determination unit 14b, the friction permissible threshold function output unit 16b operates to calculate an approximate function of the friction characteristic estimation value with respect to the temperature value, and a standard deviation with respect to this approximate function, and to calculate a friction permissible threshold function on the basis of the approximate function and the standard deviation to output the friction permissible threshold function to the friction abnormality detection unit 11b. Here, an example of the approximate function is a function of the friction characteristic in proportion to the temperature value, which is obtained in a least-squares method. The friction characteristic estimation value is expressed by the following formula (1). Further, the friction permissible threshold function is expressed by the following formula (2).

[Formula 1]

Friction characteristic estimation value=Temperature dependence term×Temperature value+Constant term   (1)

[Formula 2]

Friction permissible threshold function=(Mean value of temperature dependence term±Standard deviation of temperature dependence term×Coefficient)×Temperature value+(Mean value of constant term±Standard deviation of constant term×Coefficient)   (2)

In the set period for the vibration permissible threshold, the vibration permissible threshold output unit 17 calculates a vibration permissible threshold on the basis of the mean value and standard deviation calculated from the vibration characteristic estimation value outputted by the vibration characteristic estimation unit 12 to output the vibration permissible threshold to the vibration abnormality detection unit 13.

As described above in the fourth embodiment, in a period of the drive unit 1 being normal, determined by the drive time integration unit 18 and the set period determination unit 14b, an operation is performed to set each of the friction permissible threshold function and the vibration permissible threshold which are necessary to detect an abnormality based on the friction characteristic estimation value and the vibration characteristic estimation value. By so doing, the friction permissible threshold function and vibration permissible threshold set in the period of the drive unit 1 being normal can be compared with estimation results of friction and vibration caused in the drive unit 1, and thus it is possible to detect an abnormality in the friction and vibration caused in the drive unit 1.

Further, since the electric motor control device according to the fourth embodiment does not need a temperature friction model as with the third embodiment, it is possible to shorten the set period. Further, since the electric motor control device according to the fourth embodiment uses the friction permissible threshold function that is a function of the friction characteristic in proportion to the temperature value, there is no need to provide an environment where the ambient temperature is controlled and the temperature variation is small, which is required in the third embodiment, Here, it is sufficient that each of the set periods determined by the set period determination unit 14b is equal to or smaller than the basic rating lives of the components of the electric motor 3 and the drive mechanism 2. Thus, each of the set periods may be a period to be set in accordance with a trial operation period for start-up of the mechanical device including the electric motor 3 and the drive mechanism 2, or a running-in operation period after parts replacement of the mechanical device.

Further, the electric motor control device according to the fourth embodiment may also include the drive amount integration unit 19 outputting a drive amount integrated value in place of the drive time integration unit 18 as with the second embodiment. In the case where the control device includes the drive amount integration unit 19, each of the set periods determined by the set period determination unit 14b may be determined on the basis of a drive amount integrated value. Further, the period for the friction permissible threshold function output unit 16b to calculate the friction permissible threshold function and the period for the vibration permissible threshold output unit 17 to calculate the vibration permissible threshold are set as the same period, but these periods may be set as different periods as in the first and second embodiments.

As described above, also according to the fourth embodiment, there is no need to perform either of an operation for determining the permissible value and an operation for pre-storing the vibration waveform into the vibration waveform database. Accordingly, it is possible to provide an electric motor control device that can easily derive a mechanical characteristic permissible threshold from a mechanical characteristic estimation value, to detect a mechanical characteristic abnormality from the mechanical characteristic estimation value and the mechanical characteristic permissible threshold. Further, according to the fourth embodiment, there is no need of a temperature friction model even not in an environment having a small temperature variation, so that the calculation cost can be reduced.

Fifth Embodiment

Figure 6:
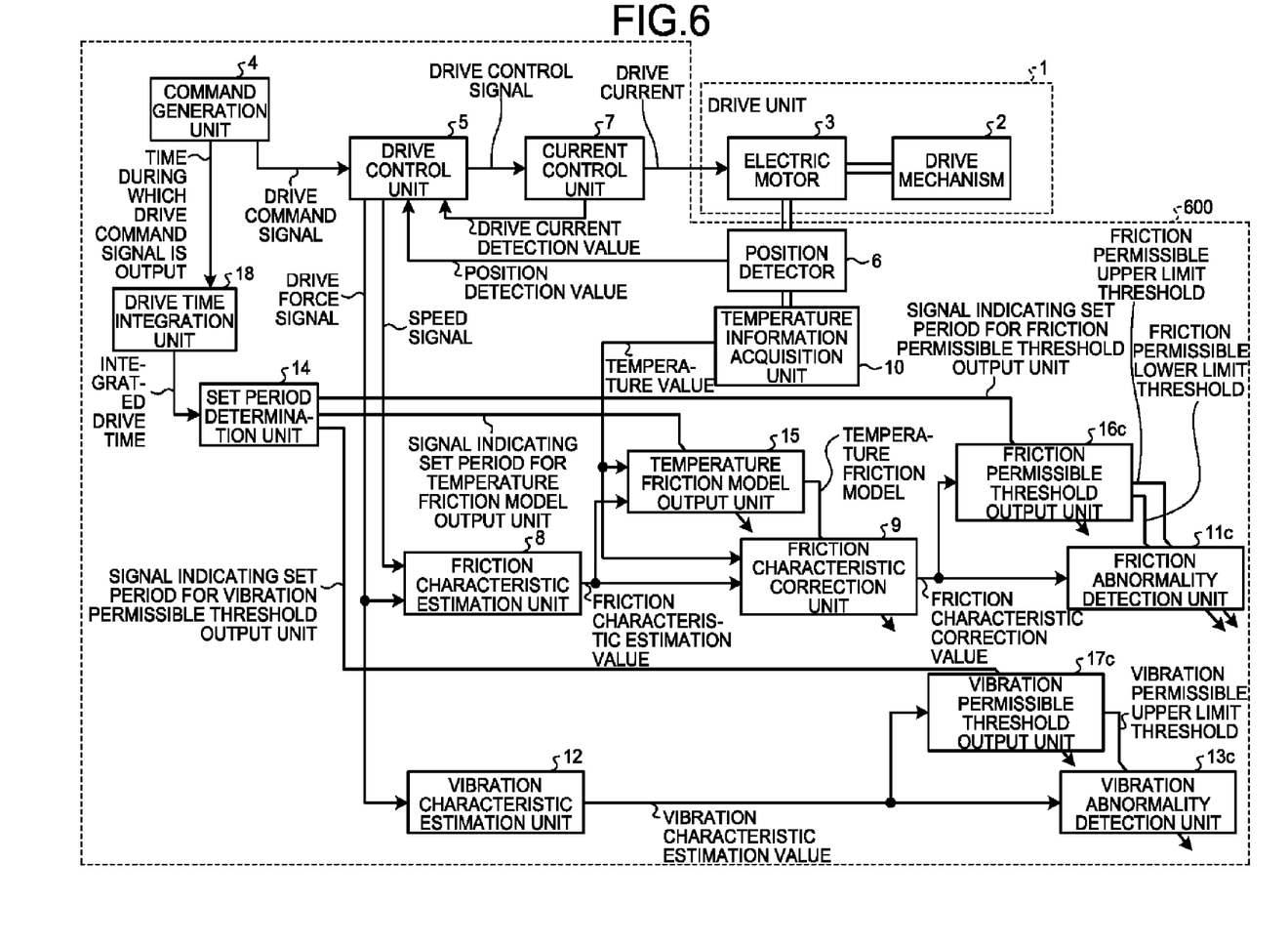
FIG. 6 is a block diagram illustrating an example configuration of an electric motor control device according to a fifth embodiment.

FIG. 6 is a block diagram illustrating an example configuration of an electric motor control device according to a fifth embodiment of the present invention. The electric motor control device 600 illustrated in FIG. 6 differs from the device illustrated in FIG. 1, in that this electric motor control device includes: a friction abnormality detection unit 11c in place of the friction abnormality detection unit 11; a friction permissible threshold output unit 16c in place of the friction permissible threshold output unit 16; a vibration abnormality detection unit 13c in place of the vibration abnormality detection unit 13; and a vibration permissible threshold output unit 17c in place of the vibration permissible threshold output unit 17. The other components denoted by the same reference symbols as those of FIG. 1 are the same as those described above in FIG. 1, and thus their description will be omitted.

Next, an explanation will be given for an operation of the electric motor control device illustrated in FIG. 6. In the friction abnormality detection unit 11c, a friction permissible upper limit threshold and a friction permissible lower limit threshold are set. When an input friction characteristic correction value is larger than the friction permissible upper limit threshold, the friction abnormality detection unit 11c detects that the friction caused in the drive unit 1 has an abnormal increase. On the other hand, when an input friction characteristic correction value is smaller than the friction permissible lower limit threshold, the friction abnormality detection unit 11c detects that the friction caused in the drive unit 1 has an abnormal decrease distinctively from the result of the above abnormal increase.

In the set period for the friction permissible threshold output unit 16c determined by the set period determination unit 14, the friction permissible threshold output unit 16c operates to calculate the mean value and standard deviation of the friction characteristic correction value, and to calculate the friction permissible upper limit threshold and the friction permissible lower limit threshold on the basis of the mean value and standard deviation of the friction characteristic correction value to output the friction permissible upper and lower limit thresholds to the friction abnormality detection unit 11c.

Here, the friction permissible upper limit threshold can be expressed by "the mean value+the standard deviation×an upper limit threshold coefficient", and the friction permissible lower limit threshold can be expressed by "the mean value−the standard deviation×a lower limit threshold coefficient". For example, in the case where it is considered that the friction decrease is less influential on the drive unit 1 but the friction increase may lead to a serious failure of the drive unit 1, the upper limit threshold coefficient is set to 2.97 and the lower limit threshold coefficient is set to 3.62. With this setting, an increase phenomenon of the friction characteristic correction value whose occurrence probability is lower than 0.3% is to be detected as a friction abnormal increase, and a decrease phenomenon of the friction characteristic correction value whose occurrence probability is lower than C.03% is to be detected as a friction abnormal decrease.

The friction caused in the drive unit 1 depends on a lubricating oil or grease serving as a lubricant, the preload of a bearing or ball screw or a linear guide used in the drive mechanism. It is predictable that the friction is increased when the lubricating oil increases its viscosity or the grease is hardened, due to aging, or a foreign matter is mixed therein. On the other hand, it is predictable that the friction is reduced when the lubricating oil reduces its viscosity or the grease is softened, or the preload is lowered. The friction abnormality detection unit 11c distinctly detects an abnormal increase and abnormal decrease of the friction, thereby making it possible to realize discriminative diagnosis of these phenomena.

In the vibration abnormality detection unit 13c, the vibration permissible upper limit threshold is set. When an input vibration characteristic estimation value is larger than the vibration permissible upper limit threshold, the vibration abnormality detection unit 13c detects that the vibration caused in the drive unit 1 has an abnormal increase.

In the set period for the vibration permissible threshold output unit determined by the set period determination unit 14, the vibration permissible threshold output unit 17c operates to calculate the mean value and standard deviation of the vibration characteristic estimation value, and to calculate the vibration permissible upper limit threshold on the basis of the mean value and standard deviation of the vibration characteristic estimation value to output the vibration permissible upper limit threshold to the vibration abnormality detection unit 13c. The vibration permissible upper limit threshold can be determined in the same manner as m the friction permissible upper limit threshold.

As described above, according to this embodiment, when the friction characteristic correction value is larger than the friction permissible upper limit threshold, a friction abnormal increase is detected. Further, when the friction characteristic correction value is smaller than the friction permissible lower limit threshold, a friction abnormal decrease is detected. It is predicted that a different phenomenon exists in the friction increase from that is the friction decrease, vice versa, so that the user can take different optimum actions for the abnormal increase and the abnormal decrease of friction.

Further, a friction increase due to, for example, a foreign matter mixed therein may lead to a serious failure in the drive unit 1 even if its increase width is small. On the other hand, the friction decrease hardly leads to a serious failure in the drive unit 1. For this reason, for the friction increase, it is preferable to set the friction permissible upper limit threshold so as to detect an abnormality even if the friction increase is small. On the other hand, for the friction decrease, it is preferable to set the friction permissible lower limit threshold so as not to detect an abnormality if the friction decrease is small. By so doing, setting can be realized such that a maintenance operation for the drive unit 1 is performed even if the friction increase is small in the case of friction increase, and a maintenance operation for the same is performed after a large change is generated in the case of friction decrease. This enables the maintenance operation to be more efficient.

Further, as regards the vibration, an increase in vibration amplitude is thought to be caused by a failure, such as damage of the drive unit 1, but a decrease in vibration amplitude does not have to be determined as occurrence of an abnormal phenomenon. When an input vibration characteristic estimation value is larger than the vibration permissible upper limit threshold, an abnormal increase of vibration caused in the drive unit 1 is detected, so that a maintenance operation for the drive unit 1 is performed only when the vibration amplitude is increased. This enables the maintenance operation to be more efficient.

Here, it is sufficient that each of the set periods determined by the set period determination unit 14 is equal to or smaller than the basic rating lives of the components of the electric motor 3 and the drive mechanism 2. Thus, each of the set periods may be a period to be set in accordance with a trial operation period for start-up of the mechanical device including the electric motor 3 and the drive mechanism 2, or a running-in operation period after parts replacement of the mechanical device.

Further, in the fifth embodiment, the drive time integration unit 18 calculates an integrated drive time by integrating the duration time during which the command generation unit 4 outputs the drive command signal, but the present invention is not limited to this manner. The drive time integration unit 18 may calculate an integrated drive time by integrating the number of times the command generation unit 4 outputs the drive command signal.

Further, the electric motor control device according to the fifth embodiment may also include the drive amount integration unit 19 outputting a drive amount integrated value in place of the drive time integration unit 18 as in the second embodiment. Where the control device includes the drive amount integration unit 19, each of the set periods to be determined by the set period determination unit 14b may be determined on the basis of a drive amount integrated value.

Further, although the period for the friction permissible threshold output unit 16c to calculate the friction permissible threshold, the period for the vibration permissible threshold output unit 17c to calculate the vibration permissible threshold, and the period for the temperature friction model output unit 15 to calculate the temperature friction model are set as different periods, these periods may be set as the same period as in the third and fourth embodiments.

Further, the drive force signal outputted by the drive control unit 5 may be calculated based on the drive current detection value outputted by the current control unit 7, or may be calculated based on the drive control signal.

Further; in the fifth embodiment, the temperature information acquisition unit 10 is attached to the position detector 6, but the present invention is not limited to this manner. When the position detector 6 has a temperature detection unit, the temperature information acquisition unit 10 may be substituted by this temperature detection unit. Further, the temperature information acquisition unit 10 may be attached to the drive unit 1 to directly acquire the temperature of the drive unit 1, or may be attached to another part whose temperature changes in dependence upon the temperature of the drive unit 1.

Further, an explanation has been given here for a configuration equipped with the position detector 6 for detecting the position in the electric motor 3, but the present invention is not limited to this configuration.

Further, in the first to fifth embodiments described above, an explanation has been given for a configuration that includes both of the friction abnormality detection unit and the vibration abnormality detection unit, and an explanation has been given for an electric motor control device that can detect an friction abnormality and a vibration abnormality at the same time. However, an electric motor control device according to the present invention is not limited to these examples, and may have a configuration that includes any one of the friction abnormality detection unit and the vibration abnormality detection unit.

Further, in the first to fifth embodiments described above, an explanation has been given for a case where the friction characteristic and the vibration characteristic are used as the mechanical characteristic, for example, but there may be a configuration that estimates only any one of these mechanical characteristics. Further, the mechanical characteristic according to the present invention is not limited to the friction characteristic or vibration characteristic, and the present invention may be applied to another mechanical characteristic. Specifically, in consideration of an application to another mechanical characteristic, the friction characteristic estimation unit and the vibration characteristic estimation unit can be collectively referred to as "mechanical characteristic estimation unit". And in the same consideration, the friction permissible threshold output unit and the vibration permissible threshold output unit can be collectively referred to as "mechanical characteristic permissible threshold output unit". Further in the same consideration, the friction abnormality detection unit and the vibration abnormality detection unit can be collectively referred to as "mechanical characteristic abnormality detection unit".

Further, in the first to fifth embodiments described above, an explanation has been given while separately referring to functional units included in the electric motor control device, but the present invention is not limited to this separation. One processor may be used to serve as a plurality of functional units collectively. For example, one processor may be used to serve as both of the friction characteristic estimation unit 8 and the vibration characteristic estimation unit 12 of FIG. 1.

Further, according to the first to fifth embodiments described above, since it is possible to predict the occurrence of an abnormality, and/or to detect an abnormality at an early or minor stage, the service life of the mechanical device can be prolonged with possible earlier parts replacement. Further, since it is possible to prevent an unforeseen stoppage of production activity or physical distribution, the efficiency of distribution can be improved. Further, since it is possible to prevent an abnormal operation of the mechanical device, waste of energy due to the abnormal operation can be suppressed, and the environmental load can be reduced.

The configurations illustrated in the above embodiments are mere examples of the present invention, and they may be combined with other publicly known techniques, or may be partially omitted or modified without departing from the gist of the present invention.

REFERENCE SIGNS LIST 1 chive unit; 2 drive mechanism; 3 electric motor; 4 command generation unit; 5, 5a drive control unit; 6 position detector; 6a speed detector; 7 current control unit; 8 friction characteristic estimation unit; 9 friction characteristic correction unit; 10, 10a temperature information acquisition unit; 11, 11a, 11b, 11c friction abnormality detection unit; 12, 12a vibration characteristic estimation unit; 13, 13c vibration abnormality detection unit; 13a operation time vibration abnormality detection unit; 13b stop time vibration abnormality detection unit; 14, 14a, 14b set period determination unit; 15 temperature friction model output unit; 16, 16a, 16c friction permissible threshold output unit; 16b friction permissible threshold function output unit; 17, 17c vibration permissible threshold output unit; 17a operation time vibration permissible threshold output unit; 17b stop time vibration permissible threshold output unit; 18 drive time integration unit; 19 drive amount integration unit; 100, 200, 300, 400, 500 electric motor control device.

The invention claimed is:

1. An electric motor control device controlling an electric motor that drives a drive unit, the electric motor control device comprising:
a command generation unit to output a drive command signal;
an operation detection unit to detect a position or detect a speed of the electric motor, and output an operation detection value;
a drive control unit to receive the operation detection value, the drive command signal, and a drive current detection value, and output a drive control signal and a drive force signal;
a current control unit to receive the drive control signal and output a drive current to the electric motor, detect the drive current detection value from the drive current, and output the drive current detection value;
a mechanical characteristic estimation unit to receive at least the drive force signal, and output a mechanical characteristic estimation value;
an integration unit to output an integrated drive time of the drive unit on the basis of a duration time during which the drive command signal is outputted, or to output a drive amount integrated value of the drive unit on the basis of a duration time during which the drive command signal is outputted;
a mechanical characteristic permissible threshold output unit to receive the mechanical characteristic estimation value and a signal indicating a set period, and output a mechanical characteristic permissible threshold;
a set period determination unit to receive the integrated drive time or the drive amount integrated value of the drive unit, and output the signal indicating a set period; and
a mechanical characteristic abnormality detection unit to receive the mechanical characteristic permissible threshold and the mechanical characteristic estimation value, and detect a mechanical characteristic abnormality.

2. The electric motor control device according to claim 1, wherein
the mechanical characteristic permissible threshold output unit is a friction permissible threshold output unit to output a friction permissible threshold,
the drive control unit outputs a speed signal, the drive control signal, and the drive force signal,
the mechanical characteristic estimation unit is a friction characteristic estimation unit to receive the speed signal and the drive force signal, and output a friction characteristic estimation value as the mechanical characteristic estimation value, and
the mechanical characteristic abnormality detection unit is a friction abnormality detection unit to detect a friction abnormality as the mechanical characteristic abnormality.

3. The electric motor control device according to claim 1, wherein
the mechanical characteristic estimation unit is a vibration characteristic estimation unit to receive the drive force signal, and output a vibration characteristic estimation value as the mechanical characteristic estimation value, and
the mechanical characteristic abnormality detection unit is a vibration abnormality detection unit to detect a vibration abnormality as the mechanical characteristic abnormality.

4. An electric motor control device controlling an electric motor that drives a drive unit, the electric motor control device comprising:
a command generation unit to output a drive command signal;

an operation detection unit to detect a position or detect a speed of the electric motor, and output an operation detection value;

a drive control unit to receive the operation detection value, the drive command signal, and a drive current detection value, and output a drive control signal, a speed signal, and a drive force signal;

a current control unit to receive the drive control signal and output a drive current to the electric motor, detect the drive current detection value from the drive current, and output the drive current detection value;

a friction characteristic estimation unit to receive the speed signal and the drive force signal, and output a friction characteristic estimation value;

a vibration characteristic estimation unit to receive the drive force signal, and output a vibration characteristic estimation value;

an integration unit to output an integrated drive time or a drive amount integrated value of the drive unit on the basis of a duration time during which the drive command signal is outputted;

a friction permissible threshold output unit to receive the friction characteristic estimation value and a signal indicating a friction permissible threshold set period, and output a friction permissible threshold;

a vibration permissible threshold output unit to receive the vibration characteristic estimation value and a signal indicating a vibration permissible threshold set period, and output a vibration permissible threshold;

a set period determination unit to receive the integrated drive time or the drive amount integrated value of the drive unit, and output the signal indicating a friction permissible threshold set period and the signal indicating a vibration permissible threshold set period;

a friction abnormality detection unit to receive the friction permissible threshold and the friction characteristic estimation value, and detect a friction abnormality; and a vibration abnormality detection unit to receive the vibration permissible threshold and the vibration characteristic estimation value, and detect a vibration abnormality.

5. The electric motor control device according to claim 4, wherein
the drive control unit outputs a speed signal, the drive control signal, and the drive force signal,
the vibration characteristic estimation unit receives the speed signal, and
the vibration characteristic estimation unit discriminates and outputs a value of the vibration characteristic estimation value in an operation time of the drive unit, and the vibration characteristic estimation value in a stop time of the drive unit on the basis of the speed signal.

6. The electric motor control device according to claim 4, comprising:
a temperature information acquisition unit to acquire a temperature of the drive unit or a temperature of a part whose temperature is changed along with a temperature of the drive unit, and output a temperature value;
a friction characteristic correction unit to receive the friction characteristic estimation value, and correct the friction characteristic estimation value using a temperature friction model whose friction characteristic is changed in dependence upon the temperature value to output a friction characteristic correction value; and
a temperature friction model output unit to calculate the temperature friction model from the friction characteristic estimation value and the temperature value, and set the temperature friction model in the friction characteristic correction unit,
wherein the friction abnormality detection unit receives the friction characteristic correction value, and detects the friction abnormality by comparing the friction characteristic correction value with the friction permissible threshold.

7. The electric motor control device according to claim 4, comprising:
a temperature information acquisition unit to acquire a temperature of the drive unit or a temperature of a part whose temperature is changed along with a temperature of the drive unit, and output a temperature value;
a friction permissible threshold function output unit substituting for the friction permissible threshold output unit, to receive the temperature value, the friction characteristic estimation value, and a signal indicating a set period for the friction permissible threshold output unit, and output a friction permissible threshold function; and
a friction abnormality detection unit to receive the friction permissible threshold function and the friction characteristic estimation value, and detect a friction abnormality.

8. The electric motor control device according to claim 1, wherein the mechanical characteristic permissible threshold output unit calculates and outputs the mechanical characteristic permissible threshold in a period determined by a signal indicating a set period for the mechanical characteristic permissible threshold output unit.

9. The electric motor control device according to claim 1, wherein
the mechanical characteristic permissible threshold output unit outputs a mechanical characteristic permissible upper limit threshold and a mechanical characteristic permissible lower limit threshold, and
the mechanical characteristic abnormality detection unit detects a mechanical characteristic abnormal increase when the mechanical characteristic estimation value is larger than the mechanical characteristic permissible upper limit threshold, and detects a mechanical characteristic abnormal decrease when the mechanical characteristic estimation value is smaller than the mechanical characteristic permissible lower limit threshold.

10. The electric motor control device according to claim 1, wherein
the mechanical characteristic permissible threshold output unit outputs a mechanical characteristic permissible upper limit threshold, and
the mechanical characteristic abnormality detection unit detects a mechanical characteristic abnormal increase when the mechanical characteristic estimation value is larger than the mechanical characteristic permissible upper limit threshold.

11. The electric motor control device according to claim 3, wherein
the drive control unit outputs a speed signal, the drive control signal, and the drive force signal,
the vibration characteristic estimation unit receives the speed signal, and
the vibration characteristic estimation unit discriminates and outputs a value of the vibration characteristic estimation value in an operation time of the drive unit, and the vibration characteristic estimation value in a stop time of the drive unit on the basis of the speed signal.

12. The electric motor control device according to claim 2, comprising:
- a temperature information acquisition unit to acquire a temperature of the drive unit or a temperature of a part whose temperature is changed along with a temperature of the drive unit, and output a temperature value;
- a friction characteristic correction unit to receive the friction characteristic estimation value, and correct the friction characteristic estimation value using a temperature friction model whose friction characteristic is changed in dependence upon the temperature value to output a friction characteristic correction value; and
- a temperature friction model output unit to calculate the temperature friction model from the friction characteristic estimation value and the temperature value, and set the temperature friction model in the friction characteristic correction unit,
- wherein the friction abnormality detection unit receives the friction characteristic correction value, and detects the friction abnormality by comparing the friction characteristic correction value with the friction permissible threshold.

13. The electric motor control device according to claim 2, comprising:
- a temperature information acquisition unit to acquire a temperature of the drive unit or a temperature of a part whose temperature is changed along with a temperature of the drive unit, and output a temperature value;
- a friction permissible threshold function output unit substituting for the friction permissible threshold output unit, to receive the temperature value, the friction characteristic estimation value, and a signal indicating a set period for the friction permissible threshold output unit, and output a friction permissible threshold function; and
- a friction abnormality detection unit to receive the friction permissible threshold function and the friction characteristic estimation value, and detect a friction abnormality.

* * * * *